US012747313B2

(12) United States Patent
Hermant

(10) Patent No.: US 12,747,313 B2
(45) Date of Patent: Sep. 29, 2026

(54) PROCESS FOR THE PRODUCTION OF A VINYL CHLORIDE-(METH)ACRYLATE COPOLYMER AND COMPOSITION COMPRISING SUCH A COPOLYMER

(71) Applicant: INOVYN EUROPE LIMITED, Runcorn (GB)

(72) Inventor: Thomas Hermant, Lonzee (BE)

(73) Assignee: INOVYN EUROPE LIMITED, Runcorn (GB)

( * ) Notice: Subject to any disclaimer, the term of this patent is extended or adjusted under 35 U.S.C. 154(b) by 426 days.

(21) Appl. No.: 18/252,814

(22) PCT Filed: Nov. 8, 2021

(86) PCT No.: PCT/EP2021/080884
§ 371 (c)(1),
(2) Date: May 12, 2023

(87) PCT Pub. No.: WO2022/101117
PCT Pub. Date: May 19, 2022

(65) Prior Publication Data

US 2023/0416433 A1 Dec. 28, 2023

(30) Foreign Application Priority Data

Nov. 13, 2020 (EP) .................................... 20207585

(51) Int. Cl.
*C08F 220/14* (2006.01)
*C08F 214/06* (2006.01)

(52) U.S. Cl.
CPC .......... *C08F 220/14* (2013.01); *C08F 214/06* (2013.01)

(58) Field of Classification Search
CPC ...... C08F 214/06; C08F 220/14; C08F 14/06; C08F 2/20; C08F 2/001; C08L 2205/025
See application file for complete search history.

(56) References Cited

U.S. PATENT DOCUMENTS 2,563,079 A 8/1951 Smith
2,843,574 A 7/1958 Port et al.
2,868,763 A 1/1959 Montgomery
3,833,686 A 9/1974 Graham et al.
3,884,887 A 5/1975 Montgomery
4,547,550 A 10/1985 Melby et al.
4,719,265 A 1/1988 Thunig et al.
5,185,406 A 2/1993 Grauer et al.
5,232,991 A 8/1993 Sturm et al.
6,583,221 B1 6/2003 Omura et al.
6,730,741 B1 * 5/2004 Honda .................... C08L 27/06 525/228
9,957,385 B2 5/2018 Brizzolara et al.
10,407,529 B2 9/2019 Brizzolara et al.
2009/0137744 A1 * 5/2009 Ferguson ................ C08F 14/06 525/231
2009/0143547 A1 6/2009 Lin et al.
2014/0171609 A1 6/2014 Obeso et al.
(Continued)

FOREIGN PATENT DOCUMENTS

CN 104250334 12/2014
CN 108484813 9/2018
(Continued)

OTHER PUBLICATIONS

Capek et al., "Emulsion copolymerization of vinyl chloride with butyl acrylate," Makromol. Chem. 193; 1992; pp. 1165-1179.
Macho et al., "Simultaneous Statistical Suspension Copolymerization of Vinyl Chloride with Butyl Acrylate and Grafting on Poly (butyl acrylate)," Jun. 30, 1997; pp. 649-656.
International Search Report and Written Opinion of the ISA for PCT/EP2021/080884 mailed Jan. 26, 2022, 13 pages.
Jan. 6, 2026 Office Action issued in Japanese Patent Application No. 2023-528633, pp. 1-4.
Mar. 17, 2026 Search Report issued in Colombian Patent Application No. NC2023/0006661.

*Primary Examiner* — Mark S Kaucher
(74) *Attorney, Agent, or Firm* — Nixon & Vanderhye PC

(57) ABSTRACT

The present invention relates to a process for the preparation of a co-polymer of vinyl chloride and a (meth)acrylate, and also to a composition comprising a copolymer of vinyl chloride and a (meth)acrylate having desirable properties. In particular, there is provided a process for the production of a vinyl chloride-(meth)acrylate copolymer, C, by reacting a vinyl chloride monomer, A, and an alkyl (meth)acrylate monomer, B, said process comprising: A) In a first step: i) Providing a first mixture comprising vinyl chloride monomer, A, and alkyl (meth)acrylate monomer, B, in an aqueous medium in a reactor, wherein: a. the amount of B is between 20 and 100% of the total amount of B, b. the amount of A is between 15 and 80% of the total amount of A, and c. the weight ratio of A:B is 25:75 to 75:25; ii) Polymerising said first mixture, said polymerisation taking place by: a. heating the reactor to a temperature, T1, b. adding an initiator to start polymerisation, And wherein: c. where the amount of B at the start of the polymerisation is less than 100% of the total amount of B, the rest of B is added to the reactor in this first step after initiation of the polymerisation, d. where the amount of A at the start of the polymerisation is less than 80% of the total amount of A, optionally further monomer A is added to the reactor in this first step after initiation of the polymerisation, but with the proviso that the amount of monomer A added in this first step remains less than 80% of the total amount of A, and e. polymerisation is continued until at least 50% of the total amount of monomer B has reacted; B) In a second step: i) Adding the rest of monomer A to form a second mixture, and polymerising the second mixture.

13 Claims, No Drawings

(56) References Cited

U.S. PATENT DOCUMENTS

| | | | |
|---|---|---|---|
| 2014/0275425 | A1 | 9/2014 | Kim et al. |
| 2016/0289360 | A1* | 10/2016 | Pascual Fernández ...................... C08F 214/06 |
| 2017/0291975 | A1 | 10/2017 | Ahn et al. |

FOREIGN PATENT DOCUMENTS

| | | | |
|---|---|---|---|
| DE | 2108283 | | 8/1972 |
| EP | 0 358 181 | | 3/1990 |
| EP | 0 358 182 | | 3/1990 |
| EP | 0358183 | A2 | 3/1990 |
| EP | 0 647 663 | | 4/1995 |
| EP | 0 713 892 | | 5/1996 |
| EP | 2551284 | A1 | 1/2013 |
| FR | 2001358 | | 9/1969 |
| GB | 981116 | | 1/1965 |
| JP | 40-024395 | | 10/1965 |
| JP | 45-030834 | | 10/1970 |
| JP | 2001-040217 | | 2/2001 |
| JP | 2001-294632 | | 10/2001 |
| KR | 810001266 | | 9/1981 |
| WO | 95/14063 | | 5/1995 |
| WO | 03/002621 | | 1/2003 |
| WO | 2006/080928 | | 8/2006 |
| WO | 2015090657 | A1 | 6/2015 |
| WO | 2016102558 | A1 | 6/2016 |

* cited by examiner

PROCESS FOR THE PRODUCTION OF A VINYL CHLORIDE-(METH)ACRYLATE COPOLYMER AND COMPOSITION COMPRISING SUCH A COPOLYMER

CROSS-REFERENCE TO RELATED APPLICATIONS

This application is the U.S. national phase of International Application No. PCT/EP2021/080884 filed Nov. 8, 2021 which designated the U.S. and claims priority to EP 20207585.9 filed Nov. 13, 2020, the entire contents of each of which are hereby incorporated by reference.

The present invention relates to a process for the preparation of a co-polymer of vinyl chloride and an alkyl (meth)acrylate, and also to a composition comprising a copolymer of vinyl chloride and an alkyl (meth)acrylate having desirable properties.

Polyvinylchloride (PVC) is one of the most important thermoplastic materials on the market today. Given its very good mechanical and physical properties, it is used in a large number of applications.

Several processes are known for the preparation of PVC. For example, PVC may be prepared by suspension polymerisation of vinyl chloride in a suspending liquid and in the presence of a suspending agent. This produces a slurry (or suspension) of PVC particles, typically of the order of 100 to 200 microns particle size. The resulting slurry of PVC is then dried, usually by centrifuging followed by fluid bed drying, to give a porous (i.e. sorbent) PVC. PVC produced by the suspension method is referred to as "S-PVC". S-PVC can absorb plasticisers to give a dry blend.

PVC can also be produced by what are generally known as paste polymerisation processes. Paste processes may be characterised in that the polymerisation produces a latex of polymer particles of relatively small size compared to the S-PVC process, typically 0.2 to 5 microns. The latex can be dried, for example by spray-drying to produce PVC particles in the form of agglomerates. The dried PVC polymer particles are typically much smaller than the dried particles produced by the suspension PVC processes.

PVC homopolymer itself is generally fairly rigid. It is known to add plasticisers to PVC to make it more flexible. These substances may be liquids with low volatility or solids. However, in general the flexibility of such products is not long lasting. An alternative method to improve the flexibility of PVC is to "pre-plasticise" it by polymerising in the presence of a comonomer which gives improved flexibility. Particularly preferred comonomers are acrylates and methacrylates. WO 2015/090657, for example, describes a process for the preparation of a polymer by reacting vinyl halide and a second monomer, preferably an acrylate, and in which the polymerisation is prepared in a series of steps in which the amounts of each monomer are controlled. This document notes that with the correct ratio of monomers in the final product there is no need to add additional plasticiser.

We have now found a further process for the production of a co-polymer of vinyl chloride and an alkyl (meth) acrylate, and in particular which provides a co-polymer of vinyl chloride and an alkyl (meth)acrylate with unexpected improved properties.

Thus, in a first aspect there is provided a process for the production of a vinyl chloride-(meth)acrylate copolymer, C, by reacting a vinyl chloride monomer, A, and an alkyl (meth)acrylate monomer, B, said process comprising:

A) In a first step:
   i) Providing a first mixture comprising vinyl chloride monomer, A, and alkyl (meth)acrylate monomer, B, in an aqueous medium in a reactor, wherein:
   a. the amount of B is between 20 and 100% of the total amount of B,
   b. the amount of A is between 15 and 80% of the total amount of A, and
   c. the weight ratio of A:B is 25:75 to 75:25;
   ii) Polymerising said first mixture, said polymerisation taking place by:
   a. heating the reactor to a temperature, T1,
   b. adding an initiator to start polymerisation,
   And wherein:
   c. where the amount of B at the start of the polymerisation is less than 100% of the total amount of B, the rest of B is added to the reactor in this first step after initiation of the polymerisation,
   d. where the amount of A at the start of the polymerisation is less than 80% of the total amount of A, optionally further monomer A is added to the reactor in this first step after initiation of the polymerisation, but with the proviso that the amount of monomer A added in this first step remains less than 80% of the total amount of A, and
   e. polymerisation is continued until at least 50% of the total amount of monomer B has reacted;
B) In a second step:
   i) Adding the rest of monomer A to form a second mixture, and polymerising the second mixture.

Particular features of the present invention include:
i) All of the alkyl (meth)acrylate monomer, B, is added during the first step, and at least 50% of this monomer must react in the first step.
ii) At least 20% of the total amount of vinyl chloride monomer, A, is added in the second step i.e. after all alkyl (meth)acrylate has been added.

The final vinyl chloride-(meth)acrylate copolymer generally comprises 10-50 wt % alkyl (meth)acrylate and 50-90 wt % vinyl chloride, and preferably 30-50 wt % alkyl (meth)acrylate and 50-70 wt % vinyl chloride. (Note that the percentage of each monomer in the copolymer may be calculated but is preferably measured, for example using $^1$H NMR.)

The term alkyl (meth)acrylate is used herein to encompass alkyl acrylates and alkyl methacrylates. The alkyl (meth)acrylate monomer B is preferably of the formula:

$$H_2C{=}C(R')C({=}O){-}O{-}R \quad (1)$$

where R is an alkyl group having 1 to 10 carbon atoms and R' is H or methyl.

The alkyl group may be linear or branched. Preferably the alkyl (meth)acrylate is an alkyl acrylate.

Thus, the monomer B is preferably an alkyl acrylate monomer B, and more preferably is of the formula:

$$H_2C{=}C(H)C({=}O){-}O{-}R \quad (1)$$

where R is an alkyl group having 1 to 10 carbon atoms.

The alkyl group may be linear or branched. Examples of preferred alkyl acrylate monomer B include methyl acrylate, ethyl acrylate, propyl acrylate, butyl acrylate and ethylhexyl acrylate, with butyl acrylate being the most preferred.

More than one alkyl (meth)acrylate monomer may be used, in which case the combined alkyl (meth)acrylates should be considered as the monomer B for the purposes of the present invention. Thus, in this case between 20 and 100% of the total amount of alkyl (meth)acrylates are present in the first mixture, the weight ratio of monomer A to all alkyl (meth)acrylates is 25:75 to 75:25, and all of any alkyl (meth)acrylates not added in the first mixture are added during the first step.

Preferably, however, only a single alkyl (meth)acrylate monomer is used, which in the preferred embodiments is a single alkyl acrylate monomer.

Other monomers (i.e. not vinyl chloride or alkyl (meth) acrylate) can also be polymerised and will then be present in the copolymer produced. Preferably any such monomers are present in an amount of less than 20 wt % of the final product, more preferably less than 10 wt %. When present preferably such monomers may be introduced in either the first or second step above, but preferably they are introduced in the first step, and more preferably completely in the first mixture.

Turning to the process steps more generally, the polymerisation process is generally performed as a suspension polymerisation process. The polymerisation steps may then suitably be performed in any suitable apparatus known for suspension polymerisation processes.

Typically, the polymerisation takes place in an aqueous suspension in the presence of a suitable suspension agent. Any suitable suspension agent may be used for polymerisation, but particularly preferred suspension agents are polyvinyl acetates of various degrees of hydrolysis and water-soluble cellulosic esters. These suspension agents can be used together with secondary suspension agents if desired. The amount employed may vary widely and is generally between 0.05 and 1.5% by weight calculated on vinyl chloride used. Other additives conventionally known to be used in suspension polymerisation of vinyl chloride to produce PVC may also be present, including buffers and chain transfer agents.

The use of one or more chain transfer agents is particularly preferred in the present invention. Chain transfer agents are known for use to control molecular weight in vinyl chloride polymerisations, particularly in polymerisations performed at higher temperature and higher pressure. It has been found that they are useful in the process of the present invention to lead to copolymers which can form products which have improved surface finish.

Most preferably, at least one chain transfer agent is present in the first mixture i.e. is present at initiation.

Suitable chain transfer agents are well known in the art. Typically they have at least one weak chemical bond, which facilitates the chain transfer reaction. Common chain transfer agents include thiols and halocarbons, such as carbon tetrachloride. In the present invention it has been found that thiols, particularly alkanethiols, such as mercaptan (methanethiol) and most preferably 1-dodecanethiol, provide particularly good results. Preferably the temperature to which the reactor is heated in the first step, T1, is at least 55 °C, such as at least 60 °C. Typically, T1 is in the range 60 to 80 °C, such as 65 to 75 °C The pressure in the first step is typically elevated. The pressure at the start of the step is generally dependent on the temperature, T1, and also the monomers used. The pressure during the first step can vary. Typically, the pressure during the first step is in the range of 4 to 14 bars (400 to 1400 kPa), such as 6 to 12 bars (600 to 1200 kPa).

(As used herein all pressures, unless otherwise indicated, are absolute pressures.)

The amount of B in the first mixture is between 20 and 100% of the total amount of B. As used herein, the "total amount of B" is the total amount of monomer B to be added to the process. Typically this is also the amount of monomer, B, desired to react to produce the copolymer C. (In general, the alkyl (meth)acrylate monomer, B, is more reactive than vinyl chloride monomer, A, and in the present invention all is added in the first step. Thus, usually the conversion at the end of the reaction can be assumed to be effectively 100% for the monomer, B. In such cases the "amount added" and "amount desired to react" will be the same.) Preferably the amount of B in the first mixture i.e. prior to initiation, is at least 50%, such as at least 75% of the total amount of B. In most preferred embodiments all of the monomer, B, is added in the first mixture i.e. prior to initiation.

The amount of A in the first mixture is between 15 and 80% of the total amount of A. The amount of A in the first mixture is preferably less than 60% of the total amount of A. As used herein the "total amount of A" is the total amount of vinyl chloride monomer, A, to be added to the process. In general, the total conversion of the vinyl chloride monomer, A, at the end of the process need not be 100%, but rather is selected so that a copolymer, C, with desired overall amounts (wt %) of vinyl chloride monomer, A, and of monomer, B, is obtained. Thus, the "total amount of A" includes not only vinyl chloride monomer, A, which reacts to produce the final copolymer C, but also vinyl chloride monomer, A, which is unreacted at the end of the process. In some embodiments high overall vinyl chloride monomer A conversion may be obtained, but in other embodiments a larger excess of vinyl chloride monomer A may be added to the process, particularly in the second step, and the process operated at a lower vinyl chloride monomer conversion whilst still obtaining the same product composition. However operated, and however much of monomer A is added in the first step, in the most preferred embodiments all of the vinyl chloride monomer, A, which is to be added in the first step is present in the first mixture i.e. prior to initiation.

The weight ratio of A:B in the first mixture is preferably 40:60 to 70:30, such as 45:55 to 65:35, and most preferably in the range 50:50 to 60:40.

Polymerisation may be initiated by any suitable polymerisation initiator. Suitable initiators for suspension polymerisation of PVC are well known and include, for example, organic and inorganic peroxides or diazocompounds. Specific examples of suitable initiators include peroxy compounds such as di-tertiarybutyl peroxide, lauroyl peroxide and acetyl cyclohexyl sulphonyl peroxide. Monomer-soluble free-radical polymerisation initiators that are particularly suitable for use in a polymerisation process according to the invention are the dialkyl peroxydicarbonates (the term "alkyl" including "cycloalkyl") whose alkyl radicals contain up to 20 carbon atoms, such as diethyl peroxydicarbonate, diisopropyl peroxydicarbonate, diethylhexyl peroxydicarbonate, dimyristyl peroxydicarbonate, dicetyl peroxydicarbonate, and bis (4-tertiarybutylcyclohexyl) peroxydicarbonate; azo compounds such as 2,2'-azo-bis-2,4-dimethylvaleronitrile and azo-bis-isobutyronitrile; and peroxyesters, particularly peroxyneodecanoates such as dimethyl-hydroxybutyl peroxyneodecanoate and tetramethylbutyl peroxyneodecanoate. These initiators may be used in conventional quantities—generally speaking from 0.01 to 1% by weight calculated on vinyl chloride.

Initiator may also be added in steps, with a first amount added to initiate polymerisation, and further initiator being added during the first step and/or during the second step to maintain polymerisation activity.

Polymerisation is continued in the first step until at least 50% of the total amount of monomer B has reacted. Polymerisation is preferably continued in the first step until at least 70%, such as at least 80% of monomer B has reacted, preferably at least 90% of the monomer B has reacted.

Methods to determine monomer conversion are known to those skilled in the art and include gravimetry (J M Goldwasser and A Rudin, J. Polym. Sci. Polym. Chem. ED., 1982, Vol. 20, p. 1993) and calorimetry (A Urretabizkaia, et al. J. Polym. Sci. Part A: Polym. Chem., 1994; Vol. 32, p. 1761). As one example the person skilled in the art can determine conversion from the content of comonomer B in the product versus time and the production rate. From this the person skilled in the art can determine conversion versus time for a particular set of conditions, or can provide a model to cover a range of conditions.

After the first step of the present invention, a second step is performed in which the rest of monomer A is added to form a second mixture, and is then polymerised. By "rest of monomer A" is meant the rest of the amount of monomer, A, to be added to the process. As already noted, it is usually the case that this includes excess monomer A, which it is intended will remain unreacted.

(For example, if 80% of the total amount of A desired to react to produce the final copolymer C is added to the reactor in the first step then at least the further 20% of monomer A desired must be added in this second step, but excess monomer A over and above this may be added. Correspondingly if only 60% of the total amount of A desired to react to produce the final copolymer C is added to the reactor in the first step then at least the further 40% of monomer A desired must be added in this second step, but again excess monomer A over and above this may be added in the second step.)

Polymerisation should be continued in this step until the overall conversion of monomer A corresponds to the amount of monomer A desired in the copolymer, C. Monomer conversion in this step (and the first step) may be measured, if desired, by methods known in the art, such as those described above. However, in general, and although the two are linked, the second step is operated so that the desired product is obtained rather than to obtain a specific monomer A conversion as such. In particular, as already noted, the total conversion of the vinyl chloride monomer, A, at the end of the process need not be 100%, but rather is selected so that a copolymer, C, with desired overall amounts (wt %) of monomer A and monomer, B, is obtained.

Nevertheless, the conversion in this second step will correspond to the equivalent of reaction of at least 20% of the overall monomer A conversion (since this is the minimum amount of the total amount of monomer A added in this step). It is preferred that the process is operated with an overall conversion of monomer A which is relatively high, such as at least 50%, and more preferably at least 60%.

Typically the total amount of monomer A added to the process is less than 200% of the amount of monomer A desired to react to produce the final copolymer C. However, neither this nor the overall conversion of monomer A is particularly critical since any unreacted monomer A can be separated and reused. The amount of monomer A added in the second step (i.e. including any excess monomer A) is typically such that during the second step conversion equivalent to at least half of the amount of monomer A added in this second step takes place.

In embodiments, prior to the addition of monomer A in the second step the temperature of the reactor may be adjusted. In particularly preferred embodiments the temperature is reduced significantly, and in particular, it is preferably reduced, to a temperature T2, which is at least 10 °C below the temperature, T1. Thus, in preferred embodiments, the second step comprises:

i) Adjusting the temperature of the reactor to a temperature, T2, which is at least 10 °C below the temperature, T1, ii) Adding the rest of monomer A to form a second mixture, and polymerising the second mixture.

Thus, in this embodiment the first step may be finished and the second step started by reducing the temperature of the reactor.

In addition, and independently of whether there is a temperature adjustment or not, the polymerisation reaction at the end of the first step may be "paused" by the addition of a polymerisation inhibitor.

Any suitable inhibitor may be used. In general, the inhibitor will be selected by the person skilled in the art dependent on the initiator used in the first step. Examples of suitable initiators are well-known in the art. They include, for example, and depending on the initiator, iodine/iodide containing inhibitors, bases, such as alkali metal hydroxides and amines (including diethylhydroxyamine), and also α-methylstyrene. For example, potassium iodide is an effective inhibitor for this step where diethylperoxydicarbonate is the initiator.

Where an inhibitor is used at the end of the first step, then polymerisation in the second step can be restarted by addition of further initiator, optionally after or with the additional vinyl chloride monomer, A.

The initiator may be the same or different to that used in step (a), but preferably is the same. Again, conventional other additives may be added as required, such as polyvinyl alcohols.

As already discussed, the amount of monomer A added in the first step must be less than 80% of the total amount of monomer A. Accordingly, at least 20% of the total amount of monomer A is introduced in this second step. Preferably less than 60% of the total amount of monomer A is introduced during the first step. Accordingly, preferably at least 40% of the total amount of monomer A is introduced in the second step. Most preferably, at least 45% of the total amount of monomer A is introduced in the second step.

As noted, in a preferred embodiment the temperature in the second step, T2, is at least 10 °C below the temperature T1. More preferably, the temperature in the second step, T2, is at least 20 °C below the temperature T1. In absolute terms, the temperature in the second step, T2, is typically less than 60 °C, such as in the range 30 to 60 °C, and more preferably less than 50 °C, most preferably in the range 40 to 50 °C The pressure in the second step is typically elevated. The pressure at the start of the step is generally dependent on the temperature, T2, and also the monomers used. The pressure during the second step can vary. Typically, the pressure during the second step is in the range of 2 to 16 bars (200 to 1600 kPa), such as in the range 3 to 8 bars (300 to 800 kPa).

The polymerisation in the second step is continued until the desired conversion of monomer/desired product composition is reached. Additional initiator may be added during the second step as required.

Optionally, to terminate the second step an inhibitor may be added. Any suitable inhibitor may be used, and as with the option where an inhibitor is used at the end of the first step, in general, the inhibitor will be selected by the person skilled in the art dependent on the initiator used, and in particular in the second step. Examples of suitable initiators are well-known in the art and are as noted previously. In general, however, since the objective of this step is to permanently stop polymerisation (i.e. it does not need to be restarted) larger quantities may be used, or inhibitors with a stronger effect.

Where diethylperoxydicarbonate is the initiator a particularly preferred inhibitor for this step is an alkali metal hydroxide, such as NaOH. Optionally an antifoaming agent is added at the end of the second step. Any unreacted monomer, which will be principally vinyl chloride monomer A, can be removed by depressurising the reactor, and then the polymer solids can be recovered. Typically the polymer solids are subjected to a stripping step followed by filtration and drying. The polymer can be dried by any suitable method, for example in a fluid bed dryer. In preferred embodiments an anticaking agent is added before drying.

The vinyl chloride-(meth)acrylate copolymer produced typically has a bulk density of from 0.450-0.700 g/ml. The particle size distribution is usually such that D50 is from 50 to 300 microns.

The copolymer typically has an Mn of between 40,000 and 80,000, and an Mw between 100,000 and 200,000. Mw/Mn is typically 2 to 4. Mz may be between 160,000 and 300,000. As used herein each of these are as measured by Gel Permeation Chromatography (GPC). (In general, the samples are solubilised, typically in THF, filtered and injected into a liquid chromatograph with a suitable column as known in the art. Results are preferably averaged over 3 injections. PVC standard samples are used for calibration.)

It has been found that by following the steps set out above a copolymer product is formed having an improved combination of desirable properties. These are discussed further below, and include low levels of residual alkyl (meth) acrylate monomer, high values for elongation at break, and a relatively low glass transition temperature (Tg1). The product also exhibits good values for hardness (Shore A) and cold flex temperature, and exhibits no gel phase formation and a high viscosity (K value) in cyclohexanone.

It is also noted in particular that the copolymer is highly soluble in cyclohexanone which is also discussed further below. In particular, the copolymer has less than 5 wt % insolubles.

It is also noted in particular that the copolymer typically has a low water uptake, which is again discussed further below. In particular, the water uptake when immersed in water at 55 °C for 30 days is less than 10%.

Thus, in a second aspect the present invention provides a vinyl chloride-(meth)acrylate copolymer produced according to the method of the first aspect, and in particular, which preferably has i. less than 100 ppm residual alkyl (meth)acrylate monomer,
ii. an elongation at break of at least 200%, and
iii. a Tg1 of less than 10 °C, preferably between −10 °C and 10 °C Further, in a third aspect, the present invention provides a vinyl chloride-(meth)acrylate copolymer composition which comprises:

a. A vinyl chloride-(meth)acrylate copolymer which comprises 10-50 wt % alkyl (meth)acrylate and 50-90 wt % vinyl chloride, said copolymer having
    i. less than 100 ppm residual alkyl (meth)acrylate monomer,
    ii. an elongation at break of at least 200%, and
    iii. a Tg1 of less than 10 °C, preferably between −10 °C and 10 °C; and
b. At least one anti-caking agent.

As with the first aspect, the vinyl chloride-(meth)acrylate copolymer of the second aspect and the copolymer component of the composition of the third aspect preferably comprises 30-50 wt % alkyl (meth)acrylate and 50-70 wt % vinyl chloride.

Other features of the copolymer already described for the first aspect are also preferred for the copolymer of the second aspect and the copolymer component of the third aspect.

In relation to both the second and third aspects, for example, the alkyl (meth)acrylate is preferably an alkyl acrylate, and more preferably derived from a monomer of the formula:

$$H_2C{=}C(H)C({=}O){-}O{-}R \qquad (1)$$

where R is an alkyl group having 1 to 10 carbon atoms.

The alkyl group may be linear or branched, but is preferably linear. Examples of preferred monomers include methyl acrylate, ethyl acrylate, propyl acrylate, butyl acrylate and ethylhexyl acrylate with butyl acrylate being the most preferred. More than one alkyl (meth)acrylate may be present, but preferably, however, only a single (meth)alkyl acrylate monomer is present, which in the preferred embodiments is a single alkyl acrylate monomer.

Other monomers (i.e. not vinyl chloride or alkyl (meth) acrylate) can also be present in the copolymer. Preferably any such monomers are present in an amount of less than 20 wt % of the final product, more preferably less than 10 wt %.

The copolymer of the second aspect and the copolymer component of the composition in the third aspect also has other preferred copolymer properties as already described for the first aspect e.g. in relation to bulk density, particle size distribution and molecular weight properties.

We will describe below some of the further properties of the copolymer/copolymer component of the second/third aspects, and of the copolymer composition of the third aspect. For avoidance of doubt, we will refer to the "copolymer" and this term is used to encompass the copolymer produced in the first aspect, the copolymer of the second aspect and the copolymer component of the composition of the third aspect.

The copolymer has less than 100 ppm residual alkyl (meth)acrylate monomer. As used herein, residual alkyl (meth)acrylate content can be determined by GC performed on the extract obtained after extraction of the residual alkyl (meth)acrylate monomer with tert-butyl-methyl-ether in a closed vial at 85 °C. The extract is then analysed by GC. (Measurements in the present invention were determined using an Agilent 6890N equipped with flame ionization detector and using a dimethylsiloxane column (50 m length, 1.2 μm thickness film, 0.32 mm internal diameter) and operating in splitless injection mode.)

A low level of alkyl (meth)acrylates is a significant advantage as alkyl (meth)acrylates can provide an unacceptable odour to the product which can make it unsuitable for many applications.

This is one particular advantage over the products described in WO 2015/090657, for example, which generally showed residual acrylate levels well over 100 ppm. Preferably the copolymer has less than 70 ppm residual alkyl (meth)acrylate monomer, more preferably less than 50 ppm, such as less than 20 ppm residual alkyl (meth)acrylate monomer. Advantageously, the process of this invention allows obtaining a range of polymer with the quality required to go in the medical market or similar. For example, medical applications require, for evident reasons, specific physicochemical properties including a residual butyl acrylate content of 70 ppm or lower, which can be readily achieved by the present invention.

(Residual vinyl chloride is generally easier to remove than the alkyl (meth)acrylate, but for avoidance of doubt the copolymer also has a low level of residual vinyl chloride, typically much less than 1 ppm, and usually less than 0.1 ppm, such as less than 0.02 ppm.)

The residual vinyl chloride content can be determined using a head space gas chromatography technique using the method described in ISO 24538 (2008). (Measurements in the present invention were determined using a Thermo Finnigan TRACE GC, equipped with flame ionization detector and an RT Q-Bond (30 m, 20 μm thickness film, 0.52 mm internal diameter) column.)

The elongation at break is a measurement of the ability of a specimen to resist changes of shape without cracking, and in particular is the ratio between increased length and initial length after breakage of the tested specimen at a controlled temperature. As used herein this should be measured according to ISO 527-2 (2012) on a iBA sample type. (Measurements in the present invention were determined using an INSTRON 5500 Series machine.) The elongation at break is preferably at least 300%, such as at least 400%. In embodiments it may be at least 500%.

The copolymer also has good values of tensile modulus. As used herein this is also measured according to ISO 527-2 (2012) on a iBA sample type. (Measurements in the present invention were determined using an INSTRON 5500 Series machine.) The tensile modulus is preferably at least 3 MPa, such as 4 to 70 MPa.

The copolymer according to the present invention also has a glass transition temperature, determined as Tg1, of less than 10 °C, preferably between −10 °C and 10 °C. In embodiments the glass transition temperature, Tg1, is less than 5 °C, and more preferably less than 0 °C. A low Tg1 allows the composition to be used at low temperature without an additional plasticiser.

(As used herein, the glass transition temperature is determined from a heat-cool-heat cycle measured on a DSC. The measurement is made by placing a sample of 10 mg of the polymer in a crimped aluminium pan, and heating under a flow of 50 ml/min nitrogen, from −60 °C to 170 °C, at 20 °C/min, according to a method based on the method of ISO 11357-2 (2013). The data is analysed using the half-step-height method described in this standard.)

The copolymer also exhibits good values for hardness (Shore A) and cold flex temperature, and exhibits no gel phase formation and a high viscosity (K value) in cyclohexanone, showing uniformity and high molecular weight for the chain length of the polymer.

The Shore A of the copolymer is typically less than 95, such 93 or less and preferably 90 or less. The Shore A is typically at least 60, and usually at least 65. Preferred ranges are 70-90, such as 80-90. The preferred maximum values/ranges provide copolymers which are useable for “soft” applications without addition of a separate plasticiser. In contrast, higher values can provide a product which is too “hard” for many applications. Shore A as used herein is measured using the indentation method by means of a durometer as described in ISO 868 (2003).

The K value may be measured according to the method of ISO 1628-2 (1998). Preferably the K value is at least 60. K values up to 90, such as up to 80 are preferred. Most preferred K values are in the range from 65 to 75.

Cold flex temperature is a measurement of the stiffness in torsion at low temperatures. As used herein it should be measured according to ISO 458-1 (1985). The cold flex temperature of the copolymer is preferably less than −5 °C, and more preferably less than −10 °C As noted above, a particular feature of the copolymer is that it is highly soluble in cyclohexanone. In particular, the copolymer has less than 5 wt % insolubles. As used herein, cyclohexanone insolubles (“insolubles”) is determined by the following method:

i) Two grams of vinyl chloride-(meth)acrylate copolymer sample is placed in 200 ml of cyclohexanone.
ii) The solution is stirred at 25 °C for 30 minutes.
iii) The solution is filtered and the solids retained on the filter are dried and weighed.

The % insolubles is calculated by comparing the weight of the dried solids to the weight of the original sample (i.e. 2 g).

The copolymer typically has less than 2 wt % insolubles, such as less than 1 wt % insolubles. Most preferably the copolymer is completely soluble, which as used herein means that no noticeable insoluble component can be observed using the above method.

The solubility in cyclohexanone is a particularly important parameter for the accurate characterisation of vinyl chloride polymers. For example, GPC analysis (used for molecular weight measurements) and K value determinations are often performed on samples dissolved in cyclohexanone or THF. If not all the sample is soluble, then the measurements determined do not accurately represent the sample.

Further, a particular advantage in relation to the present invention is that the high solubility can be advantageous in optimising the efficient recycling of the copolymer. For example, the copolymer can be effectively separated from the anticaking agent in the third aspect and/or any other insoluble components present in a commercial product at the end of its useful life.

As also noted above, a further particular feature of the copolymer is that it preferably has a low water uptake. In particular, the water uptake is less than 10 wt % after 30 days. As used herein water uptake is determined by the following method:

1) Samples of the copolymer or copolymer composition are combined with 3 parts per hundred of a Ca/Zn stabiliser, homogenised on a two-roll mill at 160 °C and pressed at 170 °C to form a film with a thickness of 1 mm. From this are cut discs with a diameter of 5 mm. (Typical weight is 2.0 to 2.4 g per disc.)
2) The samples are threaded on to an acid resistant wire, with the samples not in contact with each other, and dried in a desiccator over silica gel at room temperature for 24 hours.
3) The samples are individually weighed (W1) and then put back on the acid resistant wire.
4) The samples are put into a beaker with water. Aluminium foil is put on top and the beaker is put into a water bath or an incubator at 55 °C (+/−1 °C).
5) Samples are removed periodically, put into water at room temperature for 15 minutes to cool down, dried with a paper towel to remove surface water and weighed again (W2) within 5 minutes.
6) % water absorption is calculated; Water abs=((W2−W1)/W1)*100%

The copolymer and copolymer compositions according to the present invention preferably show very low water uptake, which is an advantage for materials which are to be used for outdoor applications, such as roofing materials, or which are to be stored for extended periods of time. Typically the water uptake is less than 2% over 7 days. Typically the water uptake is less than 10%, and more preferably less than 5% over 30 days. (In each case as measured at 55 °C)

In contrast, and as an example, vinyl chloride-(meth) acrylate copolymers produced by emulsion polymerisation have been found to typically show significantly higher water uptake.

The copolymer composition of the third aspect of the present invention also comprises an anticaking agent. Anticaking agents are, as the name suggests, components which prevent caking of polymer particles. Caking can be particularly a problem when the polymer is "sticky", and makes the polymer difficult to handle and dry.

In this respect, WO 2015/090657 teaches to avoid too low a Tg because of the stickiness of the polymer. In contrast, in the present invention a low Tg1 is preferred, and in the third aspect we use an anticaking agent to address the issues of stickiness.

Anticaking agents which can be used to reduce or prevent caking and ensure even "sticky" polymers remain free flowing are well-known in the art, and include, for example, SIPERNAT® Specialty Silica, AEROSIL® Fumed Silica and AEROXIDE® Fumed Metal Oxides sold by Evonik.

The anticaking agent can be added in any suitable amount, which can be determined by the person skilled in the art. Typically the anticaking agent is added such that the ratio of anticaking agent to copolymer in the composition of the third aspect of the present invention is from 0.1:99.9 to 10:90, preferably from 1:99 to 10:90. In some embodiments other components e.g. other additives may be added to the composition, but typically these ratios are maintained for the anticaking agent and the copolymer components.

The copolymer of the second aspect (and the copolymer composition of the third aspect) exhibits good thermal stability, having values for induction time greater than 10 minutes, and stability time greater than 19 minutes. Values may be determined using the procedure described in the ISO 182-3 (1993) based on the detection of the hydrogen chloride and any acidic products evolved at 180 °C. The equipment used in the measurements herein was a 763 PVC Thermomat from Metrohm.

The copolymer, and particularly the copolymer composition of the third aspect, may be used for any suitable application. Particularly preferred applications are those in which migration of traditional plasticisers can make such plasticised products unsuitable, but more generally suitable applications include

- resilient flooring, including homogeneous, heterogeneous, luxury vinyl tiles (LVTs)
- roofing and architectural membranes
- swimming pool liners
- artificial vinyl leathers (upholstery, shoes, belts, wallets, purses, luggage, etc.).
- flexible hoses: automotive, garden, solvent & oil resistant/gas/anti-bacterial hoses
- footwear: shoe soles, insoles, liners, uppers and sandals
- wire and cables
- window lamination films, window gaskets,
- medical devices: tubing, masks, blood/urine/dialysis/serum bags
- toys
- food-contact flexible packaging
- stationary
- stickers
- stretched ceilings
- soft parts of technical hoses.

EXAMPLES

In the Examples the following measurement methods were used:

i) Butyl acrylate content is determined by $^1H$ NMR in a Brucker 500 MHz NMR using deuterated tetrahydrofuran as solvents.

ii) Bulk density is determined by a method equivalent to ISO 60 (1977)

iii) Average particle size is determined by a method equivalent to ISO 1624 (2001)

iv) Volatile content is determined by a method equivalent to ISO 1269 (2006)

v) Residual vinyl chloride monomer is determined using a head space gas chromatography technique according to ISO 24538 (2008) and using a Thermo Finnigan type TRACE GC as already described.

vi) Residual alkyl (meth)acrylate monomer is determined by GC performed on the extract obtained after extraction of the residual alkyl (meth)acrylate monomer with tert-butyl-methyl-ether in a closed vial at 85 °C, and using an Agilent 6890N GC as already described.

vii) K value is determined by ISO 1628-2 (1998)

viii) Thermal stability (induction time and stability time) is determined by ISO 182-3 (1993) as already described.

ix) Tg peaks are determined by a method based on the ISO 11357-2 standard as already described.

x) Shore hardness is determined according to ISO 868 (2003) as already described.

xi) Tensile modulus and elongation at break are both determined according to ISO 527-2 (2012) on a iBA sample type as already described.

xii) Water uptake is measured as already described.

Example 1

Process

In a polymerization reactor with a capacity of 94 L and equipped with a stirrer, 54 Kg of water, 3197 gr of a solution of polyvinyl alcohol with a hydrolysis degree of 72.5% at 25.75 gr/Kg in water, 682 gr of a solution of polyvinyl alcohol with a hydrolysis degree of 88% at 30.15 gr/Kg in water, 30 gr of an antifoaming agent (Erol amp 1232), 30 gr of a solution of a buffer (sodium hexamethaphosphate—NaHP) at 30 gr/Kg in water, 50 gr of a dispersion in water of a thermal stabilizer (calcium stearate) at 500 gr/Kg and 5 gr of a chain transfer agent (1-dodecanethiol).

Once the reactor was closed and agitation speed set up at 70 rpm, 2 cycles of a vacuum followed by a nitrogen purge were applied, and finally a vacuum was applied. Afterwards 4470 gr of butyl acrylate followed by 5215 gr of vinyl chloride were loaded and the agitation speed is set up at 300 rpm.

The polymerization temperature was raised at 70 °C with the double jacket. An introduction of 9.0 gr of a solution of diethyl peroxydicarbonate in dioctyl adipate with a concentration of 300 gr/Kg is loaded at the temperature of polymerization (70 °C) to start the polymerization. A second introduction of 13 gr of a solution of diethyl peroxydicarbonate in dioctyl adipate with a concentration of 300 gr/Kg at CR>5% and a third introduction of 15 gr of a solution of diethyl peroxydicarbonate in dioctyl adipate with a concentration of 300 gr/Kg is loaded at CR>10%. The reaction was kept under these conditions until the conversion rate of the butyl acrylate reaches a value higher than 80%. Afterwards, 30 gr of a solution of an inhibitor (KI) at 10 gr/Kg in water is added and the polymerization temperature is cooled down to a temperature below 45 °C Then, 5948 gr of vinyl chloride followed by 434 gr of a solution of polyvinyl alcohol with a hydrolysis degree of 80% at 31.65 gr/Kg in water and finally 30 gr of a solution of diethyl peroxydicarbonate in dioctyl adipate with a concentration of 300 gr/Kg were loaded. The reaction was kept under these conditions until the total conversion rate of vinyl chloride reaches 63.7%. Afterwards 30 gr of a solution of an inhibitor (caustic soda—NaOH) at 220 gr/Kg in water and 30 gr of an antifoaming agent (Erol amp 1232) were added to the polymerization medium. The unreacted vinyl chloride was removed by depressurizing the reactor. Then, the suspension was separated by filtration.

A portion was dried with air at 60 °C in a fluidized bed dryer to provide the copolymer product. A further portion was mixed with 2 parts per hundred (phr) of an anticaking agent and then also dried with air at 60 °C in a fluidized bed dryer to form a copolymer composition.

Copolymer Product

The content of butyl acrylate in the copolymer, determined by $^{1}H$ NMR, was 38.6 wt %. The bulk density was 0.567 g/cm3 and the average particle size was 236 microns.

The volatile content was below 0.3 wt % and the residual butyl acrylate monomer was 12 ppm.

This is significantly less than the materials obtained according to the method of WO 2015/090657.

The K value was 74.2 and the thermal stability was 22.2 minutes for the induction time and 53.4 minutes for the stability time.

The sample exhibited two Tg peaks, Tg1 being at −2 °C and the second peak at 78.3 °C, the low Tg1 allows the copolymer to be used at low temperature without an additional plasticiser.

Tensile properties were measured on a sample of the copolymer which was combined with 3 parts per hundred (phr) of a Ca/Zn stabiliser, then homogenised on a two roll mill at 160 °C and pressed at 170 °C The copolymer had a Shore hardness A of 86.5, a tensile modulus of 22.7 MPa and an elongation at break of 324%.

Thus, as well as the advantageous Tg1 and residual butyl acrylate, the copolymer also exhibits good tensile properties, including a high value of elongation at break.

The water uptake was also measured. The water uptake was 0.76% after 2 days, 1.25% after 7 days and 2.97% after 30 days.

Composition with Anticaking Agent

The composition comprising anticaking agent was a free flowing composition which showed no signs of sticking or agglomeration.

The composition exhibited two Tg peaks, Tg1 being at −1.1 °C and the second peak at 79.1 °C. These are similar to those obtained for the copolymer itself and shows that the anticaking agent does not significantly affect these. As noted, the low Tg1 allows the composition to be used at low temperature without an additional plasticiser.

Tensile properties were measured on a sample of the composition which was combined with 3 parts per hundred (phr) of a Ca/Zn stabiliser, then homogenised on a two roll mill at 160 °C and pressed at 170 °C. The composition had a Shore hardness A of 88, a tensile modulus of 23.1 MPa and an elongation at break of 343%. These are again similar to those obtained for the copolymer itself and show that the anticaking agent does not significantly affect these.

Thus, as the composition also exhibits advantageous Tg1 and residual butyl acrylate, and good tensile properties, including a high value of elongation at break.

The water uptake was also measured. The water uptake was 1.06% after 2 days, 1.92% after 7 days and 4.52% after 30 days.

Example 2

Process

In a polymerization reactor with a capacity of 94 L and equipped with a stirrer, 56357 gr of water, 2869 gr of a solution of polyvinyl alcohol with a hydrolysis degree of 72.5% at 28.7 gr/Kg in water, 507 gr of a solution of polyvinyl alcohol with a hydrolysis degree of 88% at 27.05 gr/Kg in water, 30 gr of an antifoaming agent (Erol amp 1232), 30 gr of a dispersion in water of a thermal stabilizer (calcium stearate) at 500 gr/Kg and 5.0 gr of a chain transfer agent (1-dodecanethiol).

Once the reactor was closed and agitation speed set up at 70 rpm, 2 cycles of a vacuum followed by a nitrogen purge were applied, and finally a vacuum was applied. Afterwards 4470 gr of butyl acrylate followed by 4574 gr of vinyl chloride were loaded and the agitation speed is set up at 275 rpm.

The polymerization temperature was raised at 70 °C with the double jacket. An introduction of 9.0 gr of a solution of diethyl peroxydicarbonate in dioctyl adipate with a concentration of 300 gr/Kg is loaded at the temperature of polymerization (70 °C) to start the polymerization. A second introduction of 13 gr of a solution of diethyl peroxydicarbonate in dioctyl adipate with a concentration of 300 gr/Kg at CR>5% and a third introduction of 15 gr of a solution of diethyl peroxydicarbonate in dioctyl adipate with a concentration of 300 gr/Kg is loaded at CR>10%. The reaction was kept under these conditions until the conversion rate of the butyl acrylate reaches a value higher than 80%. Afterwards, 30 gr of a solution of an inhibitor (KI) at 10 gr/Kg in water is added and the polymerization temperature is cooled down to a temperature below 45 °C Then, 5489 gr of vinyl chloride followed by 485 gr of a solution of polyvinyl alcohol with a hydrolysis degree of 80% at 28.3 gr/Kg in water and finally 30 gr of a solution of diethyl peroxydicarbonate in dioctyl adipate with a concentration of 300 gr/Kg were loaded. The reaction was kept under these conditions until the total conversion rate of vinyl chloride reaches 52.5%. Afterwards 30 gr of a solution of an inhibitor (Caustic soda—NaOH) at 220 gr/Kg in water and 30 gr of an antifoaming agent (Kem Foam X6615) were added to the polymerization medium. The unreacted vinyl chloride was removed by depressurizing the reactor. Then, the suspension was separated by filtration and the mixture is then dried with air at 60 °C in a fluidized bed dryer to provide the copolymer product.

Copolymer Product

The content of butyl acrylate in the copolymer, determined by $^{1}H$ NMR, was 46.1 wt %.

The average particle size was 244 microns and the volatile content was below 0.3 wt % and the residual butyl acrylate monomer was <10 ppm.

This is significantly less than the materials obtained according to the method of WO 2015/090657.

The bulk density was 0.512 g/cm3, the K value was 75.7 and the thermal stability was 22.8 minutes for the induction time and 38.4 minutes for the stability time.

The sample exhibited two Tg peaks, Tg1 being at −8.3 °C and the second peak at 78.7 °C, the low Tg1 allows the copolymer to be used at low temperature without an additional plasticiser.

Tensile properties were measured on a sample of the copolymer which was combined with 3 parts per hundred (phr) of a Ca/Zn stabiliser, then homogenised on a two roll mill at 160 °C and pressed at 170 °C The copolymer had a Shore hardness A of 67, a tensile modulus of 4.3 MPa and an elongation at break of 639%.

Thus, as well as the advantageous Tg1 and residual butyl acrylate, the copolymer also exhibits good tensile properties, including a high value of elongation at break.

Example 3

Process

In a polymerization reactor with a capacity of 94 L and equipped with a stirrer, 54896 gr of water, 2869 gr of a solution of polyvinyl alcohol with a hydrolysis degree of 72.5% at 28.7 gr/Kg in water, 455 gr of a solution of polyvinyl alcohol with a hydrolysis degree of 88% at 30.15 gr/Kg in water, 30 gr of an antifoaming agent (Erol amp 1232), 50 gr of a dispersion in water of a thermal stabilizer (calcium stearate) at 500 gr/Kg and 5.0 gr of a chain transfer agent (1-dodecanethiol).

Once the reactor was closed and agitation speed set up at 70 rpm, 2 cycles of a vacuum followed by a nitrogen purge were applied, and finally a vacuum was applied. Afterwards 4470 gr of butyl acrylate followed by 5031 gr of vinyl chloride were loaded and the agitation speed is set up at 275 rpm.

The polymerization temperature was raised at 70 °C with the double jacket. An introduction of 9.0 gr of a solution of diethyl peroxydicarbonate in dioctyl adipate with a concentration of 300 gr/Kg is loaded at the temperature of polymerization (70 °C) to start the polymerization. A second introduction of 13 gr of a solution of diethyl peroxydicarbonate in dioctyl adipate with a concentration of 300 gr/Kg at CR>5% and a third introduction of 15 gr of a solution of diethyl peroxydicarbonate in dioctyl adipate with a concentration of 300 gr/Kg is loaded at CR>10%. The reaction was kept under these conditions until the conversion rate of the butyl acrylate reaches a value higher than 80%. Afterwards, 30 gr of a solution of an inhibitor (KI) at 10 gr/Kg in water is added and the polymerization temperature is cooled down to a temperature below 45 °C Then, 5490 gr of vinyl chloride followed by 485 gr of a solution of polyvinyl alcohol with a hydrolysis degree of 80% at 28.3 gr/Kg in water and finally 30 gr of a solution of diethyl peroxydicarbonate in dioctyl adipate with a concentration of 300 gr/Kg were loaded. The reaction was kept under these conditions until the total conversion rate of vinyl chloride reaches 53.8%. Afterwards 30 gr of a solution of an inhibitor (caustic soda—NaOH) at 220 gr/Kg in water and 30 gr of an antifoaming agent (Kem Foam X6615) were added to the polymerization medium. The unreacted vinyl chloride was removed by depressurizing the reactor. Then, the suspension was separated by filtration and the mixture is then dried with air at 60 °C in a fluidized bed dryer to provide the copolymer product.

Copolymer Product

The content of butyl acrylate in the copolymer, determined by $^1$H NMR, was 44.1 wt %.

The average particle size was 242 microns and the volatile content was below 0.3 wt % and the residual butyl acrylate monomer was 14 ppm.

This is significantly less than the materials obtained according to the method of WO 2015/090657.

The bulk density was 0.545 g/cm3, the K value was 75.0 and the thermal stability was 25.2 minutes for the induction time and 52.8 minutes for the stability time.

The sample exhibited two Tg peaks, Tg1 being at −3.8 °C and the second peak at 78.3 °C The low Tg1 allows the copolymer to be used at low temperature without an additional plasticiser.

Tensile properties were measured on a sample of the copolymer which was combined with 3 parts per hundred (phr) of a Ca/Zn stabiliser, then homogenised on a two roll mill at 160 °C and pressed at 170 °C The copolymer had a Shore hardness A of 73, a tensile modulus of 5.6 MPa and an elongation at break of 459%.

Thus, as well as the advantageous Tg1 and residual butyl acrylate, the copolymer also exhibits good tensile properties, including a high value of elongation at break.

Comparative Example 1

Process

In this Comparative Example a relatively low amount of vinyl chloride monomer is present in the first step.

In a polymerization reactor with a capacity of 25 L and equipped with a stirrer, 11,008 gr of water, 1812 gr of a solution of polyvinyl alcohol with a hydrolysis degree of 72.5% at 30.95 gr/Kg in water, 12 gr of an antifoaming agent (Tego Antifoam KS53) and 3.0 gr of a chain transfer agent (1-dodecanethiol).

Once the reactor was closed and agitation speed set up at 150 rpm, 2 cycles of a vacuum followed by a nitrogen purge were applied, and finally a vacuum was applied. Afterwards 1788 gr of butyl acrylate followed by 823 gr of vinyl chloride were loaded and the agitation speed is set up at 300 rpm.

The polymerization temperature was raised at 70 °C with the double jacket. An introduction of 7.5 gr of a solution of diethyl peroxydicarbonate in dioctyl adipate with a concentration of 300 gr/Kg is loaded at the temperature of polymerization (70 °C) to start the polymerization. A second introduction of 7.5 gr of a solution of diethyl peroxydicarbonate in dioctyl adipate with a concentration of 300 gr/Kg at CR>5% and a third introduction of 7.5 gr of a solution of diethyl peroxydicarbonate in dioctyl adipate with a concentration of 300 gr/Kg is loaded at CR>10%. The reaction was kept under these conditions until the conversion rate of the butyl acrylate reaches a value higher than 80%. Afterwards, 22 gr of a solution of an inhibitor (KI) at 10 gr/Kg in water is added and the polymerization temperature is cooled down to a temperature below 45 °C Then, 5490 gr of vinyl chloride and 15 gr of a solution of diethyl peroxydicarbonate in dioctyl adipate with a concentration of 300 gr/Kg were loaded. The reaction was kept under these conditions until the total conversion rate of vinyl chloride reaches 49.7%. Afterwards 15 gr of a solution of inhibitor (ammonia—NH3) at 245 gr/Kg in water and 12 gr of an antifoaming agent (Tego Antifoam KS53) were added to the polymerization medium. The unreacted vinyl chloride was removed by depressurizing the reactor. Then, the suspension was separated by filtration and the mixture is then dried with air at 60 °C in a fluidized bed dryer to provide the copolymer product.

Copolymer Product

The content of butyl acrylate in the copolymer, determined by $^1$H NMR, was 36.3 wt %.

The average particle size was 145 microns and the volatile content was below 0.3 wt %.

The K value was 73.7 and the thermal stability was 18.6 minutes for the induction time and 34.2 minutes for the stability time. The sample exhibited two Tg peaks, Tg1 being at −15.5 °C and the second peak at 84.3 °C.

Tensile properties were measured on a sample of the composition which was combined with 3 parts per hundred (phr) of a Ca/Zn stabiliser, then homogenised on a two roll mill at 120 °C and pressed at 130 °C (It was not possible to process at higher temperatures as used in Examples 1 to 3).

The composition had a Shore hardness A of 95, a tensile modulus of 125 MPa and an elongation at break of 79%.

It can be seen that the tensile properties, particularly the Shore hardness A, the tensile modulus and elongation at break are relatively poor compared to the products obtained by the process according to the present invention. For example, this product has a similar butyl acrylate content as that in Example 1, but a very high Shore hardness A and tensile modulus, and a very low elongation at break.

This Example thus shows the importance of a minimum amount of vinyl chloride in combination with the monomer B in the first step on these properties.

The invention claimed is:

1. A process for the production of a vinyl chloride-(meth) acrylate copolymer, C, by reacting a vinyl chloride monomer, A, and an alkyl (meth)acrylate monomer, B, said process comprising:

A) In a first step:

i) Providing a first mixture comprising vinyl chloride monomer, A, and alkyl (meth)acrylate monomer, B, in an aqueous medium in a reactor, wherein:

a. the amount of B is between 20 and 100% of the total amount of B, b. the amount of A is between 15 and 80% of the total amount of A, and c. the weight ratio of A:B is 25:75 to 75:25;

ii) Polymerising said first mixture, said polymerisation taking place by:

a. heating the reactor to a temperature, T1, wherein the temperature, T1, is at least 55 °C, b. adding an initiator to start polymerisation, And wherein:

c. where the amount of B at the start of the polymerisation is less than 100% of the total amount of B, the rest of B is added to the reactor in this first step after initiation of the polymerisation, d. where the amount of A at the start of the polymerisation is less than 80% of the total amount of A, optionally further monomer A is added to the reactor in this first step after initiation of the polymerisation, but with the proviso that the amount of monomer A added in this first step remains less than 80% of the total amount of A, and e. polymerisation is continued until at least 50% of the total amount of monomer B has reacted;

B) In a second step:

i) Adding the rest of monomer A to form a second mixture, and polymerising the second mixture wherein prior to the addition of the rest of monomer A in this second step, the temperature of the reactor is reduced to a temperature, T2, which is at least 10 °C below the temperature, T1, and further wherein the vinyl chloride-(meth) acrylate copolymer produced comprises 30-50wt % alkyl (meth) acrylate and 50-70wt % vinyl chloride.

2. A process according to claim 1 wherein one or more chain transfer agents is present during the polymerisation.

3. A process according to claim 1 wherein the temperature, T1, is at least 60 °C.

4. A process according to claim 1 wherein the alkyl (meth)acrylate monomer B is an alkyl acrylate selected from methyl acrylate, ethyl acrylate, propyl acrylate, and butyl acrylate.

5. A process according to claim 1 wherein the amount of B in the first mixture i.e. prior to initiation, is at least 50% of the total amount of B.

6. A process according to claim 1 wherein the weight ratio of A:B in the first mixture is in the range 45:55 to 65:35.

7. A process according to claim 1 wherein polymerisation is continued in the first step until at least 80% of monomer B has reacted.

8. A vinyl chloride-(meth)acrylate copolymer produced according to claim 1.

9. A process according to claim 4 wherein the alkyl (meth)acrylate monomer B is butyl acrylate.

10. A process according to claim 5 wherein all of the amount of B is in the first mixture i.e. prior to initiation.

11. A process according to claim 1 wherein the vinyl chloride-(meth) acrylate copolymer produced has a Tg1 of less than 10 °C.

12. A process according to claim 11 wherein the Tg1 is between −10 °C and 10 °C.

13. A process according to claim 1 wherein the vinyl chloride-(meth) acrylate copolymer produced has a Tg1 of less than 10 °C and an elongation at break of at least 200%.

* * * * *